(12) United States Patent
Bergenfeld

(10) Patent No.: US 6,504,842 B1
(45) Date of Patent: Jan. 7, 2003

(54) HARDWARE COPY ASSIST FOR DATA COMMUNICATION SWITCH

(75) Inventor: Bruce Eric Bergenfeld, Agoura Hills, CA (US)

(73) Assignee: Alcatel Internetworking, Inc., Calabasas, CA (US)

( * ) Notice: Subject to any disclaimer, the term of this patent is extended or adjusted under 35 U.S.C. 154(b) by 0 days.

(21) Appl. No.: 09/126,916

(22) Filed: Jul. 30, 1998

(51) Int. Cl.$^7$ ................................................ H04L 12/56
(52) U.S. Cl. ........................ 370/389; 370/390; 370/392; 370/413
(58) Field of Search .................... 370/389, 390, 370/391, 392, 394, 396, 398, 399, 407, 413, 414, 417

(56) References Cited

U.S. PATENT DOCUMENTS

| | | | | |
|---|---|---|---|---|
| 6,052,373 A | * | 4/2000 | Lau | 370/399 |
| 6,101,187 A | * | 8/2000 | Cukier et al. | 370/396 |
| 6,185,206 B1 | * | 2/2001 | Nichols et al. | 370/390 |
| 6,216,167 B1 | * | 4/2001 | Momirov | 709/238 |
| 6,219,352 B1 | * | 4/2001 | Bonomi et al. | 370/417 |
| 6,272,134 B1 | * | 8/2001 | Bass et al. | 370/390 |

* cited by examiner

Primary Examiner—Hassan Kizou
Assistant Examiner—Saba Tsegaye
(74) Attorney, Agent, or Firm—Christie, Parker & Hale, LLP

(57) ABSTRACT

A hardware copy assist for a data communication switch copies packets in a number required to meet multicasting needs. Packets are read from a switch queue and a home mark is retained for the packet at the head of the queue to facilitate multiple reads and to prevent premature overwrites. Copying decisions may be made incidental to the retrieval of outbound headers from a linked list of table entries to minimize overhead.

3 Claims, 6 Drawing Sheets

HARDWARE COPY ASSIST FOR DATA COMMUNICATION SWITCH

BACKGROUND OF THE INVENTION

The present invention relates to data communication switching and, more particularly, to methods and devices for assisting the copying of packets for multicasting.

Data communication switches receive packets on ingress ports, format them for the "next hop", and transmit them on egress ports en route to their ultimate destinations. When more than one ultimate destination is indicated, i.e., the packet requires multicasting, the switch must generally make multiple copies of the packet or a portion thereof and prepends each of the copies with a different outbound header. Conventional switches have relied heavily on software-driven central processing units (CPUs) to accomplish the required copying. Such CPU reliance has introduced intervening steps into the switching process which have caused latency and imposed additional buffering requirements. Overall switching performance has suffered as a result. Therefore, there is a general need for methods and devices for more efficiently processing packets requiring multicasting in data communication switches, and a more particular need for a hardware-based solution to the task of multicast copying.

SUMMARY OF THE INVENTION

In its most basic feature, the present invention provides a hardware copy assist for facilitating data communication switch multicasting.

In one aspect of the invention, packets are copied in hardware in a quantity required to meet multicasting needs. This inventive aspect is achieved by storing packets in a switch queue and retaining a home mark to which a read address is reset when additional copying is indicated. Inbound packets are stored in the switch queue pending resolution of forwarding requirements. A home mark is always set to the first-written address of the packet at the head of the queue. If additional copying of the packet is indicated, the read address is reset to the home mark after the most recent copy of the packet is delivered. If additional copying is not indicated, the home mark is advanced to the first-written address for the next packet for copying from the switch queue after the most recent copy is delivered.

In another aspect of the invention, the home mark is used in a watermark check to guarantee that the packet at the head of the queue is not overwritten before the required number of copies has been made. This inventive aspect is achieved by using the differential between the write address and the home mark (rather than the current read address) as the benchmark of current queue fullness in a watermark check wherein the decision is made whether to grant queuing clearance to the next inbound data. By relying on the write address/home mark differential (rather than the write address/read address differential) in the watermark check, the addresses in which the packet at the head of the queue are stored are placed off-limits to the next inbound packet until it is certain that additional copying of the packet at the head of the queue will not be required.

In a preferred embodiment of the invention, the hardware copy assist is implemented with minimal switching overhead by making copying decisions incidental to the retrieval of outbound headers. Outbound headers are preferably retrieved by indexing a header table wherein all outbound headers for the same packet are stored as a linked list of entries. A check is made of each entry as the linked list is "walked-down" to determine if there is another entry in the linked list, as indicated by the presence of a valid "next entry" index. If there is a valid "next entry" index, the read address is reset to the home mark after the most recent copy of the packet is delivered. If there is not a valid "next entry" index, however, the home mark is advanced to the read address after the most recent copy of the packet is delivered.

These and other aspects of the present invention may be better understood by reference to the following detailed description taken in conjunction with the accompanying drawings which are briefly described below. Of course, the actual scope of the invention is defined by the appended claims.

DETAILED DESCRIPTION OF THE PREFERRED EMBODIMENT

Figure 1:
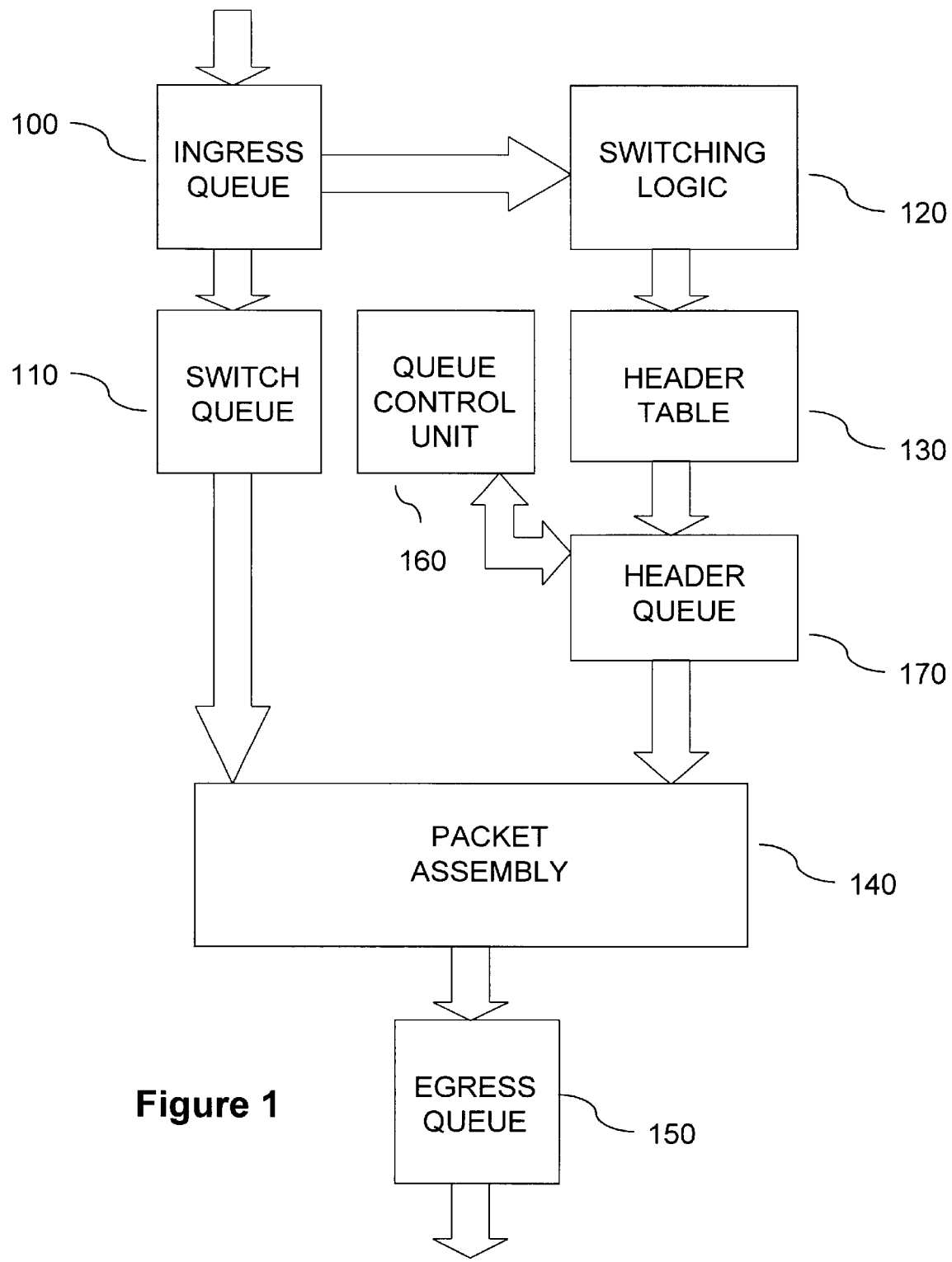
FIG. 1 is a block diagram of a data communication switching architecture in which the present invention may be implemented.

In FIG. 1, a switching architecture in which the present invention may be implemented is shown. In the basic switching operation, inbound packets arrive at ingress queue 100, are formatted for the "next hop" by prepending appropriate outbound headers, and are delivered as outbound packets to egress queue 150. More particularly, identifiers in the headers of inbound packets are transmitted to switching logic 120 for a switching decision. If forwarding is indicated, switching logic 120 transmits the appropriate forwarding index to header table 130 to retrieve information for encoding in outbound headers for the packet. In this regard, linked lists of entries are constructed in header table 130 for forwarding multicast packets to an appropriate array of destinations. In addition to storing information for encoding in a particular outbound header, therefore, each entry may include a valid "next entry" index which identifies the index of another table entry having information for encoding in another outbound header for the same packet. Packet assembly 140 receives outbound headers from header queue 170 and combines outbound headers and copies of packet data separately-received from switch queue 110 "on the fly" into outbound packets which may be transferred on egress queue 150 to the appropriate "next hops". One possible configuration of such an "on the fly" packet assembly is described in application Ser. No. 09/097,898 entitled PACKET ASSEMBLY HARDWARE FOR DATA COMMUNICAITON SWITCH, owned by the assignee hereof. Identifiers transmitted to switching logic 120 for a switching decision may include Open System Interconnection (OSI)

Layer Two (Bridging), Layer Three (Network) and Layer Four (Transport) addresses and identifiers, by way of example. Switching logic 120 may make the switching decision by performing associative comparisons of such identifiers with known identifiers stored in a memory within switching logic 120. Such a memory may be a content addressable memory (CAM) or may be a random access memory (RAM). One possible RAM-based implementation of switching logic 120 is described in application Ser. No. 08/964,597 entitled CUSTOM CIRCUITRY FOR ADAPTIVE HARDWARE ROUTING ENGINE, owned by the assignee hereof.

Data in inbound packets which will be included in any counterpart outbound packet are retained in switch queue 110 pending the results of switching decisions. Data in inbound packets which will not be included in any counterpart outbound packet may also be stored in switch queue 110 and "skipped" upon reading the packet from switch queue 110 to packet assembly 140. Alternatively, such packet data may be dropped at ingress queue 100. For simplicity, however, the data for a particular packet which are retained in switch queue 110 will be referred to herein as a "packet" whether the entire or only selected portions of the inbound packet are actually retained. Queue control unit 160 manipulates the switch queue read address, in a manner hereinafter described, to ensure delivery the number of copies of each packet required to meet multicasting needs is delivered to packet assembly 140. Unit 160 also regulates access to switch queue 110 to prevent packets from being overwritten before the required number of copies is delivered. Packets are preferably transferred in and out of switch queue 110 on a bus which, when active, transfers a constant-bit "width" of data on each clock cycle. Each packet may span one or more widths. In addition to having bits of packet data, a "width" may include control bits sufficient to convey if the width is the first or last width of a packet.

Figure 2:
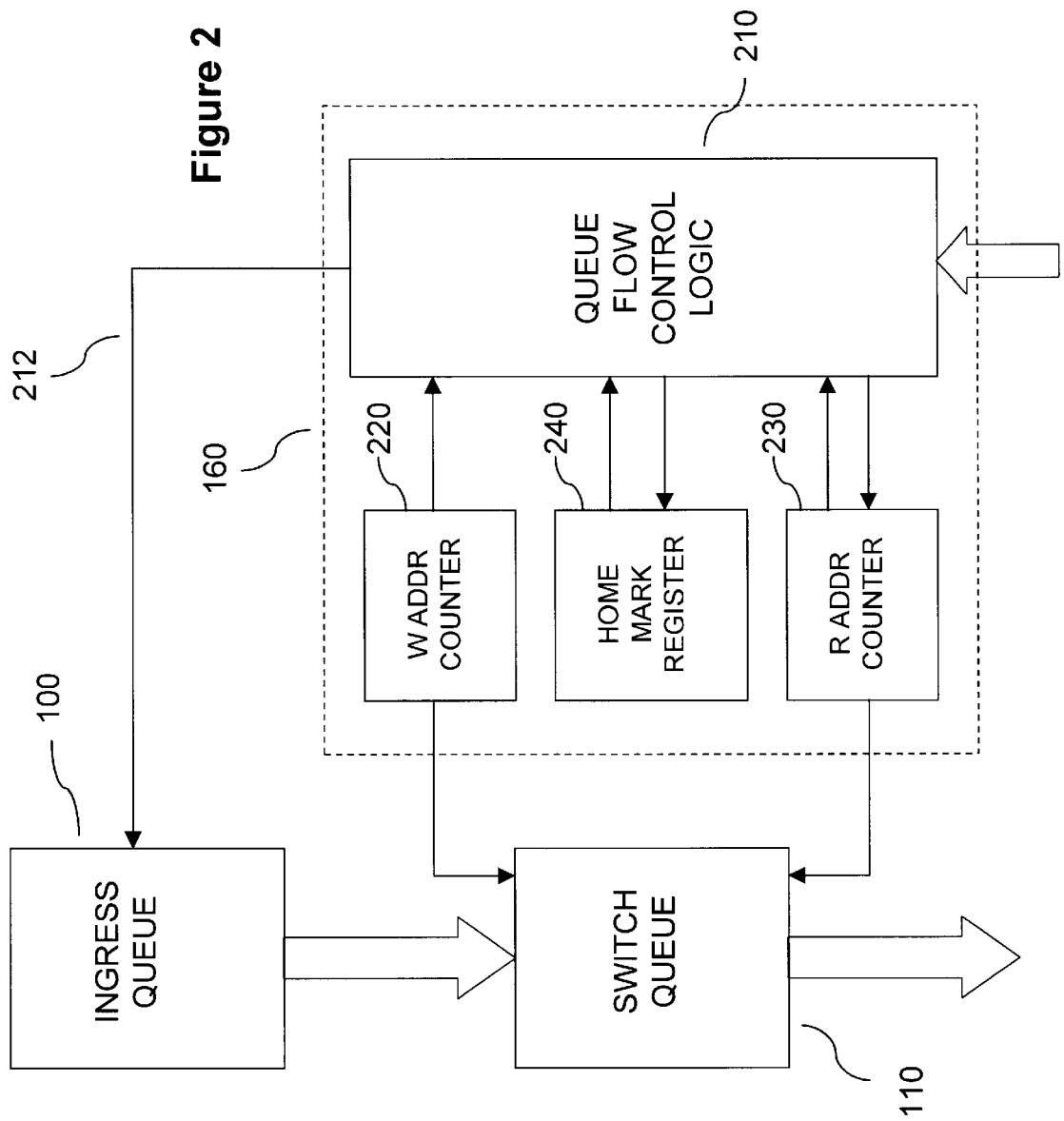
FIG. 2 is a more detailed block diagram of the queue control unit of FIG. 1 including its interfaces to the ingress queue, switch queue and header table.

Referring now to FIG. 2, queue control unit 160 is illustrated in greater detail. In a preferred embodiment, unit 160 includes queue flow control logic 210, write address counter 220, read address counter 230 and home mark register 240. Logic 210 polices data flows in and out of switch queue 110 to ensure that the appropriate number of copies of each packet are delivered to packet assembly 140 and that packets are not prematurely overwritten. To this end, logic 160 has a line on header queue 170 for receiving the current "next entry" index for the packet at the head of switch queue 110 from an entry retrieved from header table 130. Write address counter 220 holds the current write address for switch queue 110 and is incremented with each new width of data received from ingress queue 100. Read address counter 230 holds the current read address for switch queue 110. The value stored in read counter is incremented with each new width of data transmitted to packet assembly 140 and is reset under certain circumstances hereinafter explained. Home mark register 240 retains the address of the first width of the packet at the head of switch queue 110, hereinafter referred to as the home mark. The value stored in home mark register is advanced under certain circumstances hereinafter explained.

Figure 3:
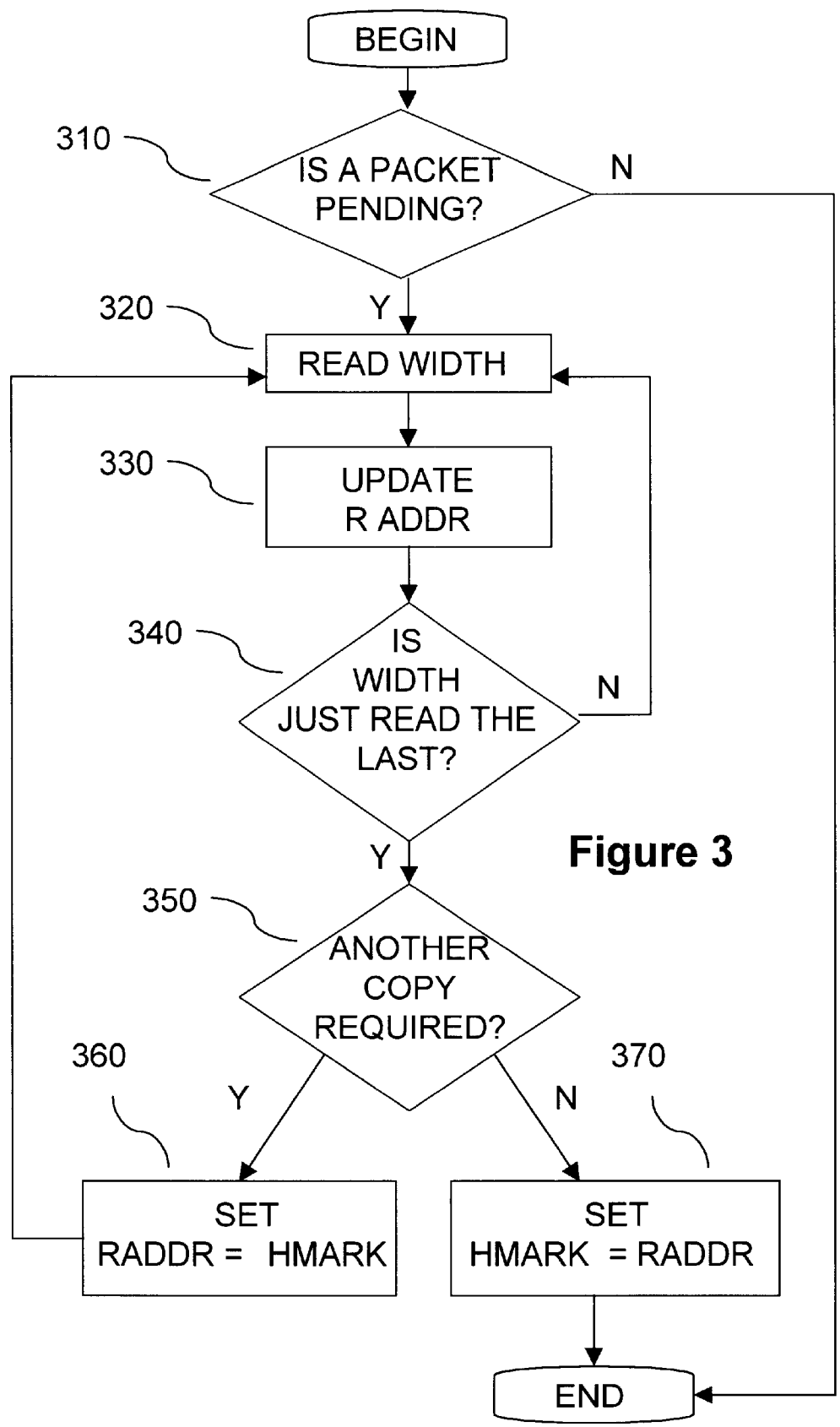
FIG. 3 is a flow diagram describing a read policing methodology performed by the queue control unit of FIG. 1.

The read policing methodology implemented with the assistance of logic 210 is described with greater particularity in the flow diagram of FIG. 3. When a packet is pending in switch queue 110 (Step 310), read address counter 220 is consulted for the current read address and the first width of the packet at the head of the queue is read from switch queue 110 to packet assembly 140 (Step 320). Read address counter 220 is incremented (Step 330) and the control bits associated with the width just read are consulted to determine if the width is the last width of the packet (Step 340). If the width is not the last width, Step 320 is repeated. If the width is the last width, however, a check is made to determine if the packet must be retained for additional copying (Step 350). In this regard, queue flow control logic 160 reviews the current "next entry" index for the packet retrieved from header queue 170. If the "next entry" index is valid, it is known that the packet will have to be retained for additional copying to meet multicasting needs and the multicast flag is set. Otherwise, if the entry does not have a valid "next entry" index, it is known that additional copies of the packet are not required and the multicast flag is not set. If the multicast flag is set, the read address is reset to the home mark (i.e., the first address of the current packet) by updating read address counter 230, and Step 320 is repeated. If the multicast flag is not set, however, the home mark is advanced to the read address (Step 370) (i.e., the first address of the next pending packet, if any) by updating home mark register 240, and the algorithm is exited. It will be appreciated that through the above policing scheme, copies of packets are delivered to packet assembly 140 in the number required to meet multicasting needs without the need for software intervention. Moreover, reliance on the dual purpose "next entry" index in header table 130 as the determinant of the need for additional copying allows this advantageous result to be achieved with minimal additional overhead.

Figure 4:
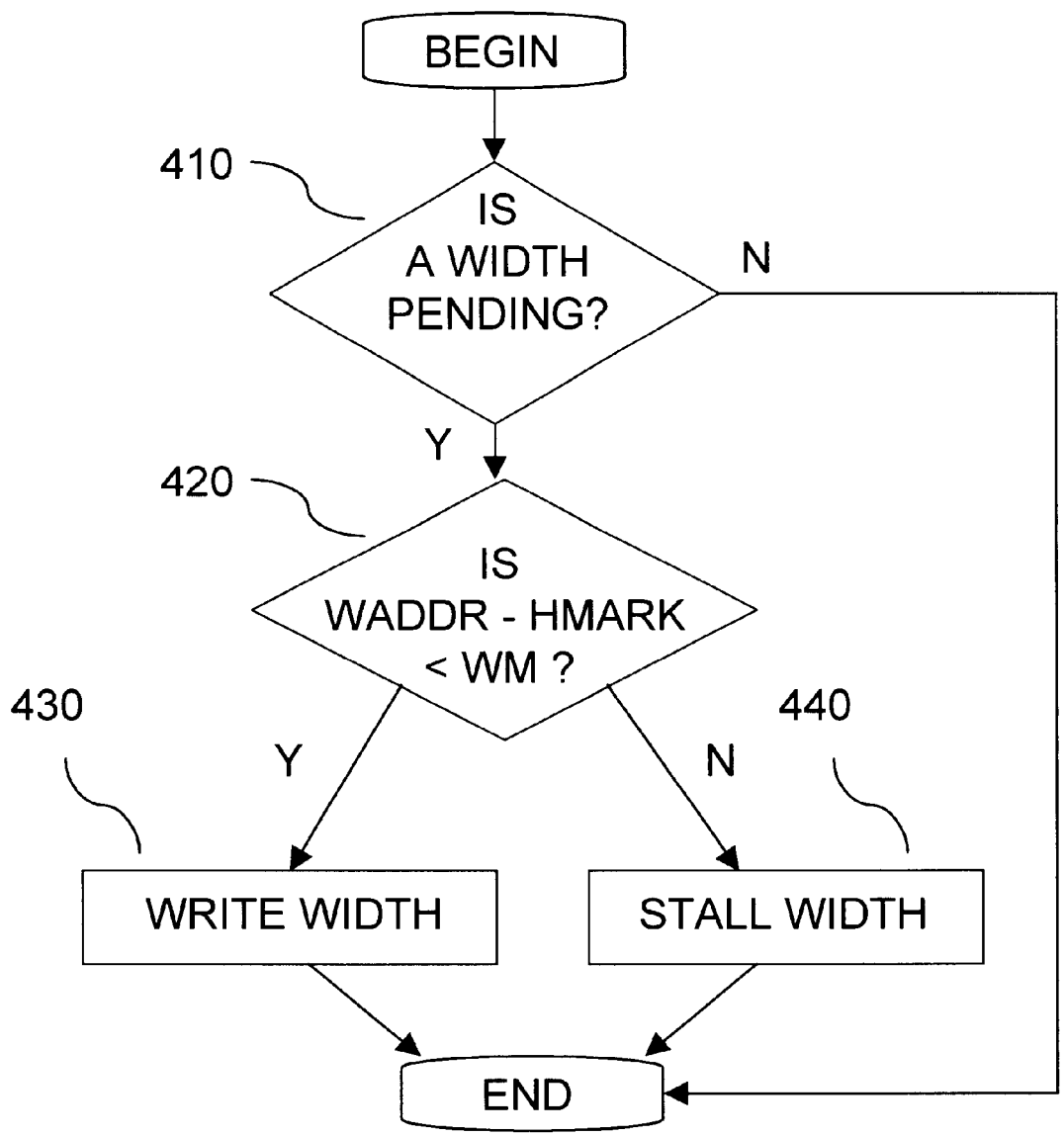
FIG. 4 is a flow diagram describing a write policing methodology performed by the queue control unit of FIG. 1.

Write policing is done to avoid overwriting the packet at the head of switch queue 110 prematurely. In this regard, because it is not known at the time decisions whether to write into switch queue 110 must be made whether the packet at the head of switch queue 110 will have to be retained for additional copying, the home mark rather than the read address is advantageously used in the queue fullness calculation. The preferred write policing methodology implemented with the assistance of logic 210 is described in FIG. 4. When a width of an inbound packet is pending in ingress queue 100 (Step 410), a watermark check is performed before releasing the width to switch queue 110. In the watermark check, the difference between the write address and the home mark (a measure of queue fullness) is compared against a configured watermark (Step 420). If the differential is less than the watermark, it is known there is ample room in switch queue 110 to receive the inbound width without overwriting the packet at the head of the switch queue 110. Therefore, the inbound width is written to switch queue 110 (Step 430). If, on the other hand, the differential is not less than the watermark, it is known that there may not be ample room in switch queue 110 to receive the inbound width without risking a premature overwrite of the packet at the head of switch queue 110. Therefore, logic 210 asserts stall line 212 and the inbound width is not delivered to switch queue 110. Watermark checks are performed regularly to reveal changes in the available status of switch queue 110 resulting from advances in the home mark. The lower limit on the configured value of the watermark is defined by the maximum allowable packet size in the switching architecture, such that a packet of any size may be queued in its entirety under a condition of maximum available capacity (i.e., when switch queue 110 is empty). The upper limit on the configured value of the watermark is defined by the capacity of switch queue 110.

Figure 5:
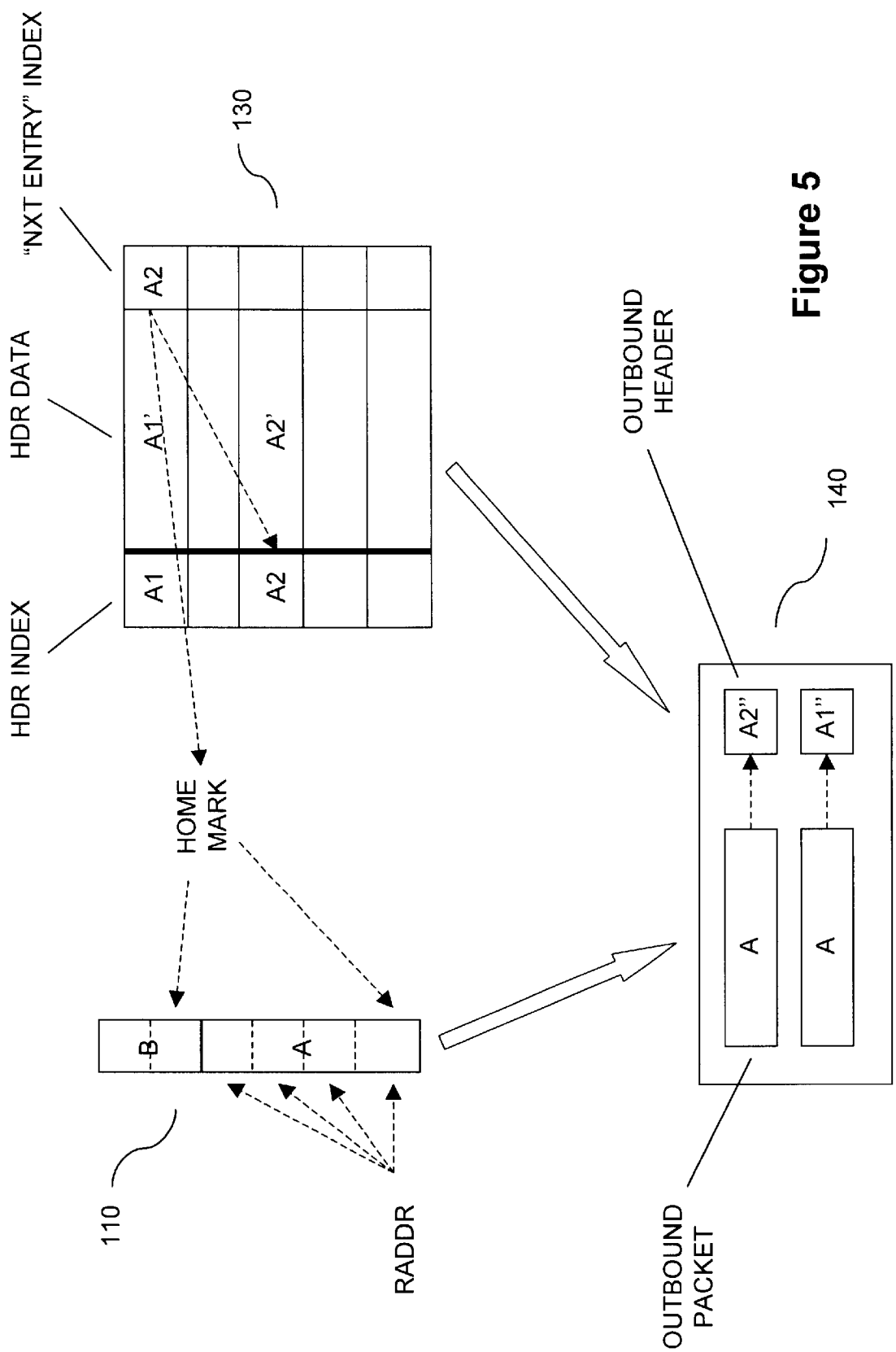
FIG. 5 is a diagram illustrating the processing of an exemplary packet within the switching architecture of FIG. 1.

Processing of an exemplary packet A at the head of switch queue 110 is illustrated in FIG. 5, which may be read in conjunction with FIG. 1. Identifiers from the exemplary packet are sent to switching logic 120 for a switching decision. Switching logic 120 returns forwarding index A1. Header table 130 is consulted at index A1 and reveals header data A1' for encoding in an outbound header. Header A1" is constructed in header queue 170 and header A1" is delivered to packet assembly 140. Separately, packet A has advanced to the head of switch queue 110 where the home mark is set to the first-written address for packet A. Packet A is delivered to packet assembly 140 in a series of widths by incrementing the read address. In packet assembly 140, header A1" is prepended to packet A to form an outbound packet for transfer to egress queue 150. Because "next entry" field in the entry retrieved from index A1 has a valid "next entry" index A2, it is known that packet A must be retained for additional copying. Therefore, the multicast flag is set and the read address is reset to the home mark. "Next entry" index A2 is looked-up in header table 130 and reveals header data A2' for encoding in another outbound header for prepending to packet data A. Header A2" is constructed in header queue 170 and header A2" is delivered to packet assembly 140. Separately, another copy of packet data A is delivered to packet assembly 140 using the read address to deliver successive widths of packet A. In packet assembly 140, header A2" is prepended to packet A to form another outbound packet for transfer to egress queue 150. Because "next entry" field in the entry retrieved from index A2 does not have a valid "next entry" index, it is known that packet A no longer needs to be retained for additional copying. Therefore, the multicast flag is not set and the home mark is advanced to the read address. Processing then begins on packet B in similar fashion.

Figure 6A:
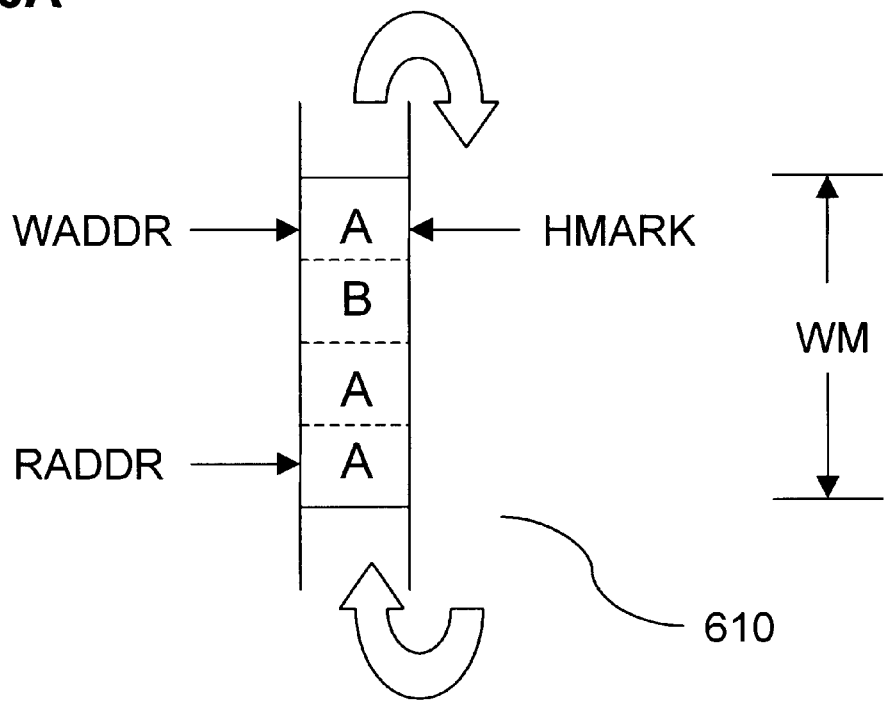
FIGS. 6A and 6B are diagrams illustrating how a watermark check within the switching architecture of FIG. 1 is operative to prevent a premature overwrite of an exemplary packet.
Figure 6B:
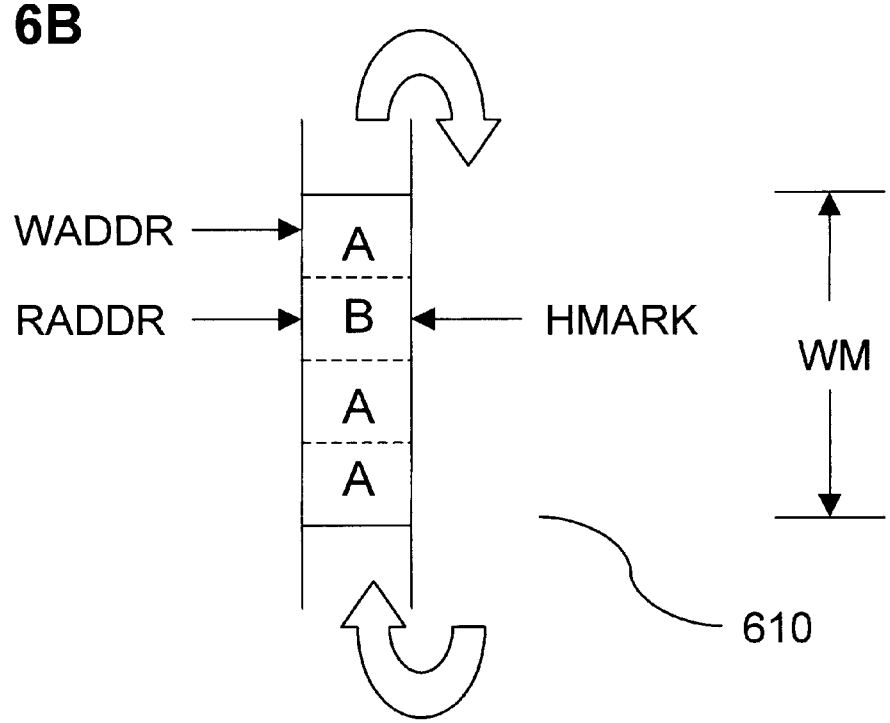

Finally, FIGS. 6A and 6B illustrate how the preferred watermark check operates to prevent premature overwrite of an exemplary packet A at the head of an exemplary switch queue 610. First, consider FIG. 6A, wherein packet A and a width of data from packet B are pending in switch queue 610 and a copy of packet A at the head of the queue is in the process of being delivered to packet assembly 140. A watermark check must be passed before additional widths of packet B (pending in ingress queue 100) may be delivered to switch queue 610. As illustrated in FIG. 6A, in the watermark check, the differential between the write address and the home mark is equal to the watermark and the watermark check is failed. (Note that if the differential between the write address and the read address were used as the basis for comparison, the watermark check would be passed and packet A would be subject to a risk of premature overwrite). The additional width is therefore not queued. Subsequently, referring to FIG. 6B, once it is known that no additional copies of packet A will have to be made, the home mark is advanced to the first-written width of packet B and the watermark check is again performed. This time, the differential between the write address and the home mark is less than the watermark and the watermark check is passed. The additional width is therefore written in switch queue 610.

It will be appreciated by those of ordinary skill in the art that the invention can be embodied in other specific forms without departing from the spirit or essential character hereof. The present invention is therefore considered in all respects illustrative and not restrictive. The scope of the invention is indicated by the appended claims, and all changes that come within the meaning and range of equivalents thereof are intended to be embraced therein.

I claim:

1. In a data communication switch, a method for avoiding premature overwrites of a packet being copied, comprising:
    (a) writing one or more packets from an ingress queue into a switch queue;
    (b) setting a write address at the address immediately following the last-written address in the switch queue;
    (c) setting a home mark at the first-written address of the packet at the head of the switch queue;
    (d) receiving an additional packet in the ingress queue;
    (e) determining whether there is ample room in the switch queue for receiving data from the additional packet using the difference between the write address and the home mark as the measure of queue fullness; and
    (f) if there is ample room, writing the data from the ingress queue into the switch queue.

2. The method for avoiding premature packet overwrites according to claim 1, wherein the difference between the write address and the home mark is compared with an established watermark to determine if there is ample room.

3. The method for avoiding premature packet overwrites according to claim 1, wherein there is ample room unless the difference between the write address and the home mark equals the established watermark.

* * * * *